(12) United States Patent
Inoue

(10) Patent No.: US 11,345,422 B1
(45) Date of Patent: May 31, 2022

(54) AUXILIARY WHEEL MECHANISM FOR TWO-WHEELED VEHICLE

(71) Applicant: TRUSTCORPORATION CO., LTD., Osaka (JP)

(72) Inventor: Kazuyoshi Inoue, Osaka (JP)

(73) Assignee: TRUSTCORPORATION CO., LTD., Osaka (JP)

( * ) Notice: Subject to any disclaimer, the term of this patent is extended or adjusted under 35 U.S.C. 154(b) by 0 days.

(21) Appl. No.: 17/600,056

(22) PCT Filed: Dec. 3, 2020

(86) PCT No.: PCT/JP2020/045142
§ 371 (c)(1),
(2) Date: Sep. 29, 2021

(87) PCT Pub. No.: WO2021/124915
PCT Pub. Date: Jun. 24, 2021

(30) Foreign Application Priority Data

Dec. 20, 2019 (JP) .............................. JP2019-230978
Jan. 25, 2020 (JP) .............................. JP2020-010446

(51) Int. Cl.
*B62H 1/12* (2006.01)
*B62J 1/08* (2006.01)
(Continued)

(52) U.S. Cl.
CPC .................. *B62H 1/12* (2013.01); *B62J 1/08* (2013.01); *B62J 1/28* (2013.01); *B62L 3/02* (2013.01); *F16C 1/10* (2013.01); *F16C 1/26* (2013.01)

(58) Field of Classification Search
CPC ...... B62H 1/12; B62J 1/08; B62J 1/28; B62L 3/02; F16C 1/10; F16C 1/26
See application file for complete search history.

(56) References Cited

U.S. PATENT DOCUMENTS

| 4,826,194 A | 5/1989 | Sakita |
| 5,029,894 A * | 7/1991 | Willman .................. B62H 1/12 180/209 |

(Continued)

FOREIGN PATENT DOCUMENTS

| JP | 26-9030 Y1 | 8/1951 |
| JP | 52-48241 | 4/1977 |

(Continued)

OTHER PUBLICATIONS

International Search Report for the present PCT-US application No. PCT/JP2020/045142 (WO/2021/124915).

(Continued)

*Primary Examiner* — Kevin Hurley
*Assistant Examiner* — Marlon A Arce
(74) *Attorney, Agent, or Firm* — Stein IP, LLC

(57) ABSTRACT

An auxiliary wheel mechanism 151 of a two-wheeled vehicle disclosed herein includes an auxiliary wheel 1, a saddle support member 7, a transmission member 9, and an auxiliary wheel urging member 23. The auxiliary wheel 1 is supported by a vehicle body 11 to be located on a side of a rear wheel 13 and to be movable between a retracted position retracted from a road surface 17 and an operative position where the vehicle body 11 is supported against the road surface 17 so as not to tilt. The saddle support member 7 is provided on the vehicle body 11 and supports a saddle 27 such that the saddle 27 is movable backward and forward. The transmission member 9 transmits a backward and forward movement of the saddle 27 to the auxiliary wheel 1 such that the auxiliary wheel 1 is located at the retracted position when the saddle 27 is located at a front position, and the auxiliary wheel 1 is located at the operative position when the saddle 27 is located at a rear position. The auxiliary wheel urging member 23 urges the auxiliary wheel 1 toward (Continued)

the retracted position. Accordingly, it is possible to achieve the auxiliary wheel mechanism that is for the two-wheeled vehicle and enables a rider to move an auxiliary wheel between a retracted position and an operative position without a manual operation of the rider.

9 Claims, 8 Drawing Sheets

(51) Int. Cl.
  *B62J 1/28* (2006.01)
  *F16C 1/26* (2006.01)
  *B62L 3/02* (2006.01)
  *F16C 1/10* (2006.01)

(56) References Cited

U.S. PATENT DOCUMENTS

| | | | | |
|---|---|---|---|---|
| 5,257,671 | A * | 11/1993 | Watkins | B62K 11/00 |
| | | | | 180/209 |
| 5,474,319 | A | 12/1995 | Shepherd | |
| 6,213,237 | B1 * | 4/2001 | Willman | B62K 5/10 |
| | | | | 280/297 |
| 6,845,999 | B2 * | 1/2005 | Royal, Sr | B62H 1/12 |
| | | | | 280/304 |
| 6,942,053 | B2 * | 9/2005 | Hinton | B62D 61/12 |
| | | | | 180/209 |
| 8,235,419 | B1 * | 8/2012 | Giarrusso | B62K 11/06 |
| | | | | 280/301 |
| 10,010,746 | B1 * | 7/2018 | Hsu | A63B 22/0605 |
| 11,242,109 | B2 * | 2/2022 | Henry | B62K 3/04 |
| 2015/0054319 | A1 * | 2/2015 | Kim | B62J 1/08 |
| | | | | 297/215.14 |
| 2017/0001656 | A1 * | 1/2017 | Katayama | A61H 3/04 |
| 2020/0290695 | A1 * | 9/2020 | Yamasaki | B62J 6/025 |
| 2020/0385077 | A1 * | 12/2020 | Petty | B62J 1/005 |

FOREIGN PATENT DOCUMENTS

| | | | |
|---|---|---|---|
| JP | 1-136883 | A | 5/1989 |
| JP | 5-20988 | | 3/1993 |
| JP | 6-51095 | | 7/1994 |
| JP | 6-509998 | A | 11/1994 |
| JP | 11-217092 | A | 8/1999 |
| JP | 2007-326423 | A | 12/2007 |
| JP | 2008-179333 | A | 8/2008 |
| JP | 2011-162174 | A | 8/2011 |
| JP | 2013-203289 | | 10/2013 |
| JP | 2015-34002 | A | 2/2015 |

OTHER PUBLICATIONS

Written Opinion of International Searching Authority for the present PCT-US application No. PCT/JP2020/045142 (WO/2021/124915).
Notification issued by Japan Patent Office for JP2020-010446 (priority application of the present PCT-US application No. PCT/JP2020/045142 (WO/2021/124915)).
Notice of Reasons for Refusal issued by Japan Patent Office for JP2020-010446 (priority application of the present PCT-US application No. PCT/JP2020/045142 (WO/2021/124915)).
Decision to Grant a Patent (Notice of Allowance) issued by Japan Patent Office for JP2020-010446 (priority application of the present PCT-US application No. PCT/JP2020/045142 (WO/2021/124915)).

* cited by examiner

AUXILIARY WHEEL MECHANISM FOR TWO-WHEELED VEHICLE

CROSS-REFERENCE TO RELATED APPLICATIONS

This application is a national stage of International Application No. PCT/JP2020/045142, filed Dec. 3, 2020, which claims the benefit of Japanese Application No. 2019-230978, filed Dec. 20, 2019 and Japanese Application No. 2020-010446, filed Jan. 25, 2020, in the Japanese Patent Office, the disclosures of which are incorporated herein by reference.

TECHNICAL FIELD

The present invention relates to an auxiliary wheel mechanism that is for a two-wheeled vehicle and enables an auxiliary wheel provided on a side of a rear wheel to move between a retracted position retracted from a road surface and an operative position to support a vehicle body against the road surface preventing the vehicle body from tilting to a side.

BACKGROUND ART

Conventionally, techniques disclosed in Patent Literatures 1 and 2 are known as this type of auxiliary wheel mechanism. The technique disclosed in Patent Literature 1 relates to an auxiliary wheel mechanism for a bicycle, and is configured to enable a rider, by operating operation levers provided on distal ends of handlebars, to individually move, to an operative position, a pair of auxiliary wheels provided on both sides of a rear wheel and urged to a retracted position by an elastic restoring force of a spring. Further, the technique disclosed in Patent Literature 2 also relates to an auxiliary wheel mechanism for a bicycle, and is configured to enable a rider, by tilting, backward and forward, one operation lever pivotally supported by a lower pipe of a vehicle body frame, to simultaneously move a pair of auxiliary wheels provided on both sides of a rear wheel, between an operative position and a retracted position. As described above, any of these related arts requires a manual operation of the rider to move the auxiliary wheel between the retracted position and the operative position.

CITATIONS LIST

Patent Literatures

Patent Literature 1: JP 2011-162174 A
Patent Literature 2: JP 2013-203289 A

SUMMARY OF INVENTION

Technical Problems

The present invention has been made in view of the above problem, and an object is to provide an auxiliary wheel mechanism that is for a two-wheeled vehicle and enables a rider to move an auxiliary wheel between a retracted position and an operative position without a manual operation of the rider.

Solutions to Problems

In order to achieve the above object, a first aspect of the present invention is directed to an auxiliary wheel mechanism for a two-wheeled vehicle. The auxiliary wheel mechanism includes an auxiliary wheel, an auxiliary wheel support member, a saddle support member, a transmission member, and an auxiliary wheel urging member. The auxiliary wheel support member is supported by a vehicle body of the two-wheeled vehicle, and supports the auxiliary wheel such that the auxiliary wheel is located on a side of the rear wheel and is movable between a retracted position retracted from a road surface and an operative position where the auxiliary wheel supports the vehicle body against a road surface to prevent the vehicle body from tilting to a side. The saddle support member is provided on the vehicle body and supports a saddle such that the saddle is movable backward and forward. The transmission member transmits a backward and forward movement of the saddle to the auxiliary wheel support member such that the auxiliary wheel is located at the retracted position when the saddle is located at a front position, and is located at the operative position when the saddle is located at a rear position. The auxiliary wheel urging member urges the auxiliary wheel with an elastic restoring force to place the saddle at the front position and the auxiliary wheel at the retracted position.

According to this configuration, when normal driving, a rider can hold the auxiliary wheel at the retracted position by sitting on the saddle allowing the saddle to be located at the front position. This operation enables the rider to drive the two-wheeled vehicle, similarly to a two-wheeled vehicle without the auxiliary wheel, while steering the same to the right and left without the vehicle body being hindered from tilting to the sides by the auxiliary wheel. The auxiliary wheel is stably held at the retracted position as long as the rider does not move the saddle toward the rear position against an elastic restoring force of the auxiliary wheel urging member. When the rider needs the auxiliary wheel, for example, when the two-wheeled vehicle is stopped in front of a traffic light, the rider can move the auxiliary wheel to the operative position by pushing the saddle toward the rear position with the buttocks against an urging force of the auxiliary wheel urging member, and transmitting the movement through a transmission member. As a result, the stability of the vehicle body can be maintained by the auxiliary wheel even during stop or the like in which it is difficult to maintain the right and left balance. Thus, the rider can cause the auxiliary wheel to function when necessary and to retract when unnecessary, without a manual operation.

A second aspect of the present invention is directed to the auxiliary wheel mechanism for the two-wheeled vehicle according to the first aspect, in which the transmission member has a wire and a wire insertion tube that guides the wire, and the transmission member transmits a movement of the saddle toward the rear position to the auxiliary wheel support member by tension of the wire to cause a movement of the auxiliary wheel to the operative position.

According to this configuration, since the transmission member has the wire and the wire insertion tube, the configuration of the transmission member is simplified. Further, although the wire is a medium for transmitting tension, the auxiliary wheel is located at the retracted position by an urging force of the auxiliary wheel urging member when the saddle is located at the front position.

A third aspect of the present invention is directed to the auxiliary wheel mechanism for the two-wheeled vehicle according to the first or second aspect, in which the auxiliary wheel mechanism further includes a saddle urging member that urges the saddle toward the front position.

According to this configuration, since the saddle is urged to the front position by the saddle urging member in addition to the auxiliary wheel urging member, the saddle is located more stably at the front position when not pushed with the buttocks.

A fourth aspect of the present invention is directed to the auxiliary wheel mechanism for the two-wheeled vehicle according to any one of the first to third aspects, in which the saddle includes a lower back rest standing at a rear portion.

According to this configuration, the rider can easily push the saddle toward the rear position by resting the lower back on the lower back rest.

A fifth aspect of the present invention is directed to the auxiliary wheel mechanism for the two-wheeled vehicle according to any one of the first to fourth aspects, in which the auxiliary wheel support member has a proximal end portion turnably supported by the vehicle body and a distal end portion rotatably supporting the auxiliary wheel. The distal end portion is located in a rear of the proximal end portion when the auxiliary wheel is located at the retracted position. The distal end portion is located below or in front of the proximal end portion when the auxiliary wheel is at the operative position. The auxiliary wheel mechanism for the two-wheeled vehicle further includes an operative position regulating member. The operative position regulating member is supported by the vehicle body, and regulates the operative position of the auxiliary wheel by abutting on the auxiliary wheel support member to prevent the distal end portion of the auxiliary wheel support member from being positioned further ahead beyond a position predetermined in front of the proximal end portion.

According to this configuration, while the auxiliary wheel is located at the regulated operative position, even when the vehicle body tends to tilt toward a side due to a weight of the vehicle body, the rider, or the like, and thereby a weight load is applied to the auxiliary wheel, the auxiliary wheel does not retract to the retracted position but stays at the regulated operative position. Thus, the auxiliary wheel is stably held at the operative position.

A sixth aspect of the present invention is directed to the auxiliary wheel mechanism for the two-wheeled vehicle according to any one of the first to fourth aspects, in which the auxiliary wheel support member is supported by the vehicle body, and slidably supports the auxiliary wheel, allowing the auxiliary wheel to come close to and retract from the road surface. Further, the auxiliary wheel support member has a first ratchet mechanism that releasably stops, at the operative position, the auxiliary wheel having moved toward the road surface to be located at the operative position.

According to this configuration, while the auxiliary wheel is located at the operative position, even when the vehicle body tends to tilt toward a side due to a weight of the vehicle body, the rider, or the like, and thereby a weight load is applied to the auxiliary wheel, the auxiliary wheel does not retract to the retracted position but stays at the operative position. Thus, the auxiliary wheel is stably held at the operative position.

A seventh aspect of the present invention is directed to the auxiliary wheel mechanism for the two-wheeled vehicle according to the sixth aspect, in which the auxiliary wheel support member has a buffer member that absorbs or alleviates an impact from the road surface received by the auxiliary wheel located at the operative position.

According to this configuration, while the auxiliary wheel is at the operative position, an impact from the road surface transmitted from the auxiliary wheel to the vehicle body is absorbed or alleviated by the buffer member.

An eighth aspect of the present invention is directed to the auxiliary wheel mechanism for the two-wheeled vehicle according to any one of the first to seventh aspects, in which the saddle support member has a second ratchet mechanism that releasably holds, at the rear position, the saddle having moved to the rear position to cause the auxiliary wheel to be located at the operative position.

According to this configuration, when a rider moves the saddle to the rear position to cause the auxiliary wheel to be located at the operative position, the saddle is stopped at the rear position by the ratchet mechanism. This allows the auxiliary wheel to be held at the operative position. When the ratchet mechanism is released from the stopping state, the auxiliary wheel returns to the retracted position with an elastic restoring force of the auxiliary wheel urging member.

A ninth aspect of the present invention is directed to the auxiliary wheel mechanism for the two-wheeled vehicle according to any one of the first to eighth aspects, in which the auxiliary wheel mechanism further includes an annular body surrounding a brake lever and a handlebar grip of the two-wheeled vehicle. The annular body is slidable between a proximal end portion and a distal end portion of the handlebar grip. The brake lever is in a standby state when the annular body is at the proximal end portion. The brake lever turns toward the handlebar grip to actuate a brake when the annular body approaches the distal end portion.

According to this configuration, the rider can maintain a state where the brake is actuated by sliding the annular body toward the distal end portion of the handlebar grip, and can release the brake by returning the annular body to the proximal end portion. This configuration applied particularly to the auxiliary wheel mechanism for the two-wheeled vehicle according to any one of the sixth to eighth aspects of the present invention, allows the rider to park the two-wheeled vehicle in a self-standing position without using a stand, by maintaining a state where the brake is actuated with the annular body and a state where the auxiliary wheel is held at the operative position by placing the saddle to the rear position.

Advantageous Effects of Invention

As described above, according to the present invention, an auxiliary wheel mechanism that is for a two-wheeled vehicle and enables a rider to move an auxiliary wheel between a retracted position and an operative position without a manual operation of the rider is obtained.

Objects, features, aspects, and advantages of the present invention will become more apparent from the following detailed description and the accompanying drawings.

DESCRIPTION OF EMBODIMENTS

Figure 1:
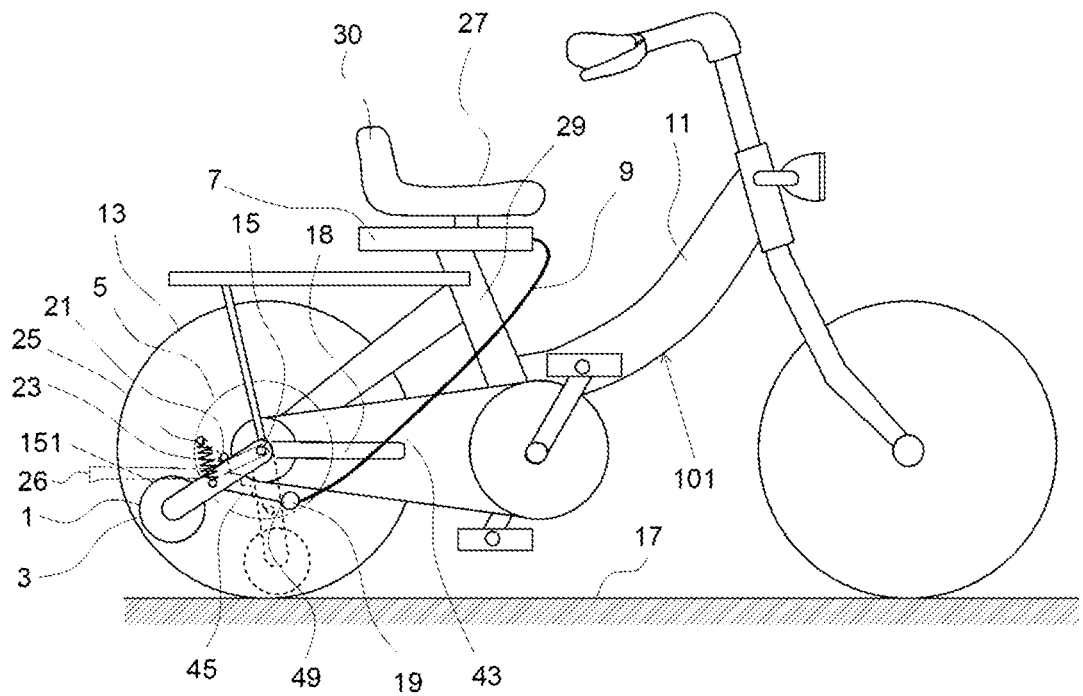
FIG. 1 is a schematic side view illustrating a bicycle in which an auxiliary wheel mechanism according to an embodiment of the present invention is installed.
Figure 2:
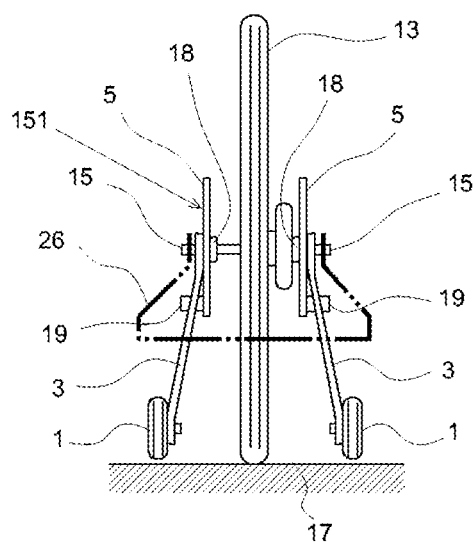
FIG. 2 is a schematic rear view illustrating a structure around a rear wheel of the bicycle in FIG. 1.

FIG. 1 is a schematic side view illustrating a bicycle in which an auxiliary wheel mechanism according to an embodiment of the present invention is installed. FIG. 2 is a schematic rear view illustrating a structure around a rear wheel of the bicycle in FIG. 1. This auxiliary wheel mechanism 151 installed in a bicycle 101 includes an auxiliary wheel 1, an auxiliary wheel support member 3, a fixing plate 5, a saddle support member 7, and a transmission member 9. As a preferable example, the auxiliary wheel 1, the auxiliary wheel support member 3, the fixing plate 5, and the transmission member 9 are provided on the right and left of a vehicle body 11 of the bicycle 101, individually forming a pair. Hereinafter, as for members provided in pairs on both the right and left sides, members installed on the right side of the vehicle body 11 will be mainly described as representatives of members on the right and left sides.

The auxiliary wheel support member 3 has a proximal end portion turnably supported by an axle 15 that rotatably supports a rear wheel 13, and a distal end portion rotatably supporting the auxiliary wheel 1. By the auxiliary wheel support member 3 turning around the axle 15, the auxiliary wheel 1 is movable between a retracted position retracted from a road surface 17 (a position in the rear of the vehicle body 11 in the illustrated example) and an operative position (a position in front of the vehicle body 11 in the illustrated example) where the auxiliary wheel support member 3 supports the vehicle body 11 against the road surface 17 to prevent the vehicle body 11 from tilting toward a side. FIG. 2 illustrates the auxiliary wheel 1 at the operative position.

The fixing plate 5 is a plate fixed to a chain stay 18, which is a part of the vehicle body 11. In the illustrated example, the fixing plate 5 has a disk shape, whereas may have any contour shape. On the fixing plate 5, an operative position regulating member 19 is fixed. The operative position regulating member 19 regulates the operative position of the auxiliary wheel 1 by abutting on the auxiliary wheel support member 3 from the front so that the auxiliary wheel 1 does not move forward beyond a predetermined operative position. In the illustrated example, the operative position regulating member 19 is a protruding member protruding outwardly from a main surface of the fixing plate 5 toward a side of the vehicle body 11. As illustrated in the figure, it is desirable that a fixed position of the operative position regulating member 19 is determined such that the distal end portion of the auxiliary wheel support member 3 is located in front of the proximal end portion, when the auxiliary wheel 1 is in a predetermined operative position. Accordingly, while the auxiliary wheel 1 is located at a predetermined regulated operative position, even when the vehicle body 11 tends to tilt toward the side due to a weight of the vehicle body 11, a rider, or the like, and thereby a weight load is applied to the auxiliary wheel 1, the auxiliary wheel 1 does not retract to the retracted position but stays at the regulated operative position. Thus, the auxiliary wheel 1 is stably held at the operative position.

On the fixing plate 5, a retracted position regulating member 21 that regulates the retracted position of the auxiliary wheel is further fixed. The retracted position regulating member 21 regulates the retracted position of the auxiliary wheel 1 by abutting on the auxiliary wheel support member 3 so that the auxiliary wheel 1 does not further retract from the road surface 17 beyond a predetermined retracted position. In the illustrated example, the retracted position regulating member 21 is also a protruding member protruding outwardly from the main surface of the fixing plate 5 toward a side of the vehicle body 11. To the auxiliary wheel support member 3, there is attached one end of an auxiliary wheel urging member 23 that urges the auxiliary wheel 1 via the auxiliary wheel support member 3 to cause the auxiliary wheel 1 to move toward the retracted position. In the illustrated example, the auxiliary wheel urging member 23 is a tension coil spring. Another end of the auxiliary wheel urging member 23 is connected to a pin 25 that is a protruding member provided on the fixing plate 5.

When the bicycle 101 is parked, a proximal end portion of a stand 26 that supports the vehicle body 11 on the road surface 17 is supported by the axle 15 such that the stand 26 is turnable between an operative position and a retracted position, similarly to the auxiliary wheel support member 3. The stand 26 is set in a shape that does not interfere with the auxiliary wheel 1 and the auxiliary wheel support member 3. FIGS. 1 and 2 illustrate the stand 26 at the retracted position. In the illustrated example, the stand 26 is installed outside the auxiliary wheel support member 3, whereas may be installed inside (closer to the rear wheel 13).

The saddle support member 7 is a member that supports a saddle 27 such that the saddle is movable backward and forward. In the illustrated example, the saddle support member 7 is fixed to an upper end portion of a seat tube 29. The backward and forward movement of the saddle 27 is transmitted to the auxiliary wheel 1 by the transmission member 9 via the auxiliary wheel support member 3. That is, the auxiliary wheel mechanism 151 enables the rider sitting on the saddle 27 to turn the auxiliary wheel support member 3 by moving the saddle 27 backward and forward with the lower back, and as a result, move the auxiliary wheel 1 between the operative position and the retracted position. As illustrated in the figure, it is desirable that the saddle 27 is provided with a lower back rest 30 standing at a rear portion. The rider can easily push the saddle 27 backward by resting the lower back on the lower back rest 30. The saddle 27 provided in the bicycle 101 may be used as it is, or the saddle 27 may be separately prepared as a part of the auxiliary wheel mechanism 151.

Figure 3:
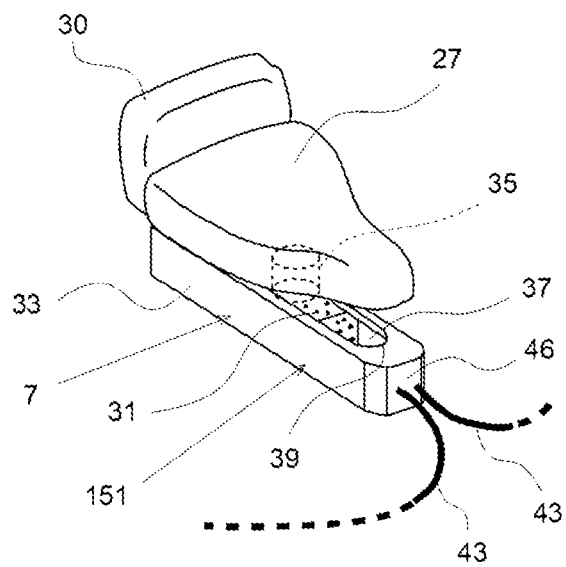
FIG. 3 is a perspective view illustrating a structure around a saddle of the bicycle in FIG. 1.
Figure 4:
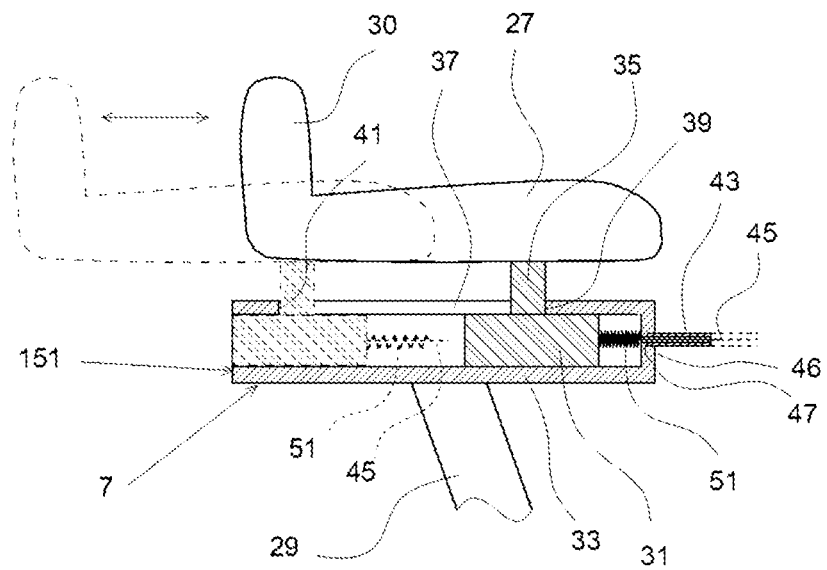
FIG. 4 is a side cross-sectional view illustrating a structure around the saddle of the bicycle in FIG. 1.

FIGS. 3 and 4 respectively are a perspective view and a side cross-sectional view illustrating a structure of the saddle support member 7. The illustrated saddle support member 7 includes a rectangular parallelepiped slider 31 connected to the saddle 27, and a tubular body 33 that slidably guides the slider 31 backward and forward. The saddle 27 and the slider 31 are connected by a columnar body 35 protruding from an upper surface of the slider 31. On an upper wall of the tubular body 33, there is formed an opening 37 extending backward and forward and enabling movement of the columnar body 35. A front end edge 39 and a rear end edge 41 of the opening 37 abut on the columnar body 35 from the front and the back, respectively, to play a role of regulating a movable range of the saddle 27.

In the illustrated example, the transmission member 9 includes a wire insertion tube 43 and a wire 45 inserted through the wire insertion tube 43, similarly to a member widely used to transmit a lever operation of the bicycle 101 to a brake. The wire insertion tube 43 is a tube that guides the inserted wire 45, and has bendable flexibility and rigidity against a compressive force applied along a tube axis. One end of the wire insertion tube 43 is connected to a front wall 46 of the saddle support member 7, and the other end is connected to the operative position regulating member 19 (see FIG. 1). On the front wall 46 of the saddle support member 7, a through hole 47 is formed. The wire 45 inserted through the wire insertion tube 43 passes through the through hole 47, and has one end connected to a front surface of the slider 31. Also on the operative position regulating member 19 (see FIG. 1), a through hole 49 is formed. The wire 45 passes through the through hole 49 and has the other end connected to the auxiliary wheel support member 3. The front wall 46 of the saddle support member 7 and the front surface of the slider 31 are connected with a saddle urging member 51 that urges the saddle 27 via the slider 31 and the columnar body 35, to cause the saddle 27 to move forward. In the illustrated example, the saddle urging member 51 is a tension coil spring.

Since the auxiliary wheel mechanism 151 installed in the bicycle 101 is configured as described above, the rider, when performing normal driving, can hold the auxiliary wheel 1 at the retracted position by sitting on the saddle 27 so that the saddle 27 is located at a front position. The auxiliary wheel 1 is stably held at the retracted position while the rider does not move the saddle 27 backward against an elastic restoring force of the auxiliary wheel urging member 23 and the saddle urging member 51. Whereas, when the auxiliary wheel 1 is needed, such as when the rider temporarily stops the bicycle 101, the rider can move the auxiliary wheel 1 to the operative position by pushing the saddle 27 backward with the buttocks against an urging force of the auxiliary wheel urging member 23 and the saddle urging member 51. As a result, the stability of the vehicle body 11 can be maintained by the auxiliary wheel 1 even during stop or the like in which it is difficult to maintain the right and left balance. As described above, the auxiliary wheel 1 can be caused to function when necessary and can be retracted when unnecessary, without requiring manual operation. Further, since the saddle 27 is urged toward the front position by the saddle urging member 51 in addition to the auxiliary wheel urging member 23, the saddle 27 is more stably maintained at the front position when not pushed with the buttocks.

Figure 5:
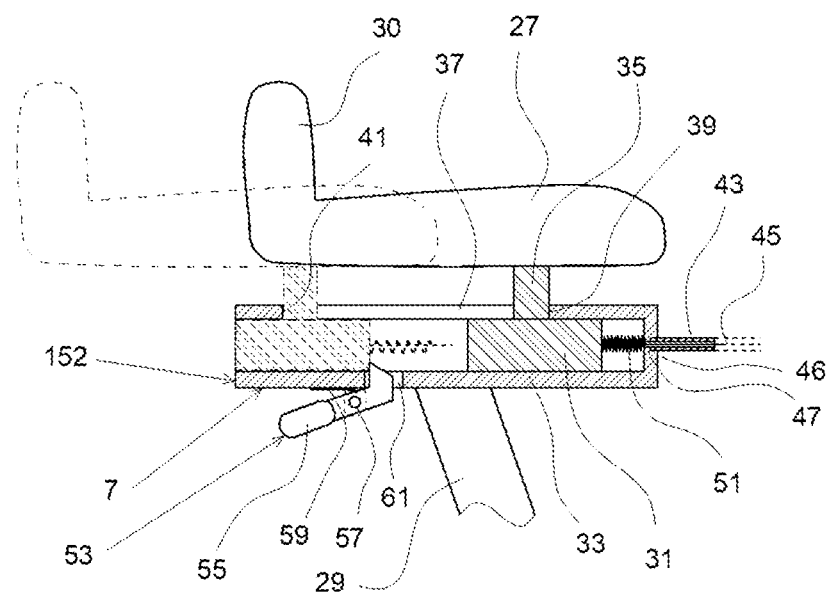
FIG. 5 is a side cross-sectional view illustrating a structure around a saddle of a bicycle in which an auxiliary wheel mechanism according to another embodiment of the present invention is installed.

FIG. 5 is a side cross-sectional view illustrating a structure around a saddle of a bicycle in which an auxiliary wheel mechanism according to another embodiment of the present invention is installed. In this auxiliary wheel mechanism 152, a ratchet mechanism 53 is provided on a saddle support member 7. The ratchet mechanism 53 does not prevent a movement of a saddle 27 to a rear position, whereas stops the saddle 27 at the rear position once the saddle 27 has moved to the rear position. As a result, an auxiliary wheel 1 is held at the predetermined operative position. The ratchet mechanism 53 can be released from the stopping state by a manual operation. When the stopping state is released, unless the rider pushes the saddle 27 backward, the saddle 27 returns to the front position due to an urging force of an auxiliary wheel urging member 23 and a saddle urging member 51. As a result, the auxiliary wheel 1 returns to a retracted position. In the illustrated example, the ratchet mechanism 53 has a lever 55 having a claw at a distal end, a lever support member 57 that tunably supports the lever 55 on a bottom wall of a tubular body 33 of the saddle support member 7, and an elastic member 59 that urges the lever 55 to move the claw upward. In the illustrated example, the elastic member 59 is a torsion coil spring. On the bottom wall of the tubular body 33, there is formed an opening 61 that receives a distal end portion of the lever 55 including the claw so that the claw of the lever 55 can reach an inside of the tubular body 33 to stop a slider 31.

Figure 6:
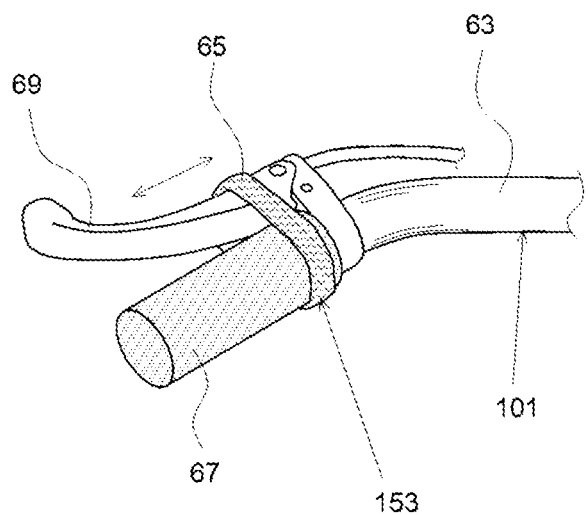
FIG. 6 is a perspective view illustrating a handlebar grip portion of a bicycle in which an auxiliary wheel mechanism according to still another embodiment of the present invention is installed.

FIG. 6 is a perspective view illustrating a handlebar grip portion of a bicycle 101 in which an auxiliary wheel mechanism according to still another embodiment of the present invention is installed. In this auxiliary wheel mechanism 153, an annular body 65 is provided to a handlebar 63. The annular body 65 desirably has a certain degree of tensile rigidity and is made of a flexible material such as rubber or leather from the viewpoint of usability. A circumferential length of the annular body 65 is set to a size large enough to surround a handlebar grip 67 and a brake lever 69 together, and a size allowing the annular body 65 to be slid between a proximal end portion and a distal end portion of the handlebar grip 67, where the brake lever 69 is in a standby state when the annular body 65 is at the proximal end portion, and the brake lever 69 turns toward the handlebar grip 67 to actuate the brake when the annular body 65 approaches the distal end portion. Accordingly, the rider can, by sliding the annular body 65 toward the distal end portion of the handlebar grip 67, maintain the brake in an actuated state. Further, the rider can release the brake by returning the annular body 65 to the proximal end portion or by returning the annular body 65 to a portion of the handlebar 63 closer to a center than the handlebar grip 67 is. Even when the rider wants to maintain the actuated state of the brake, such as when the bicycle 101 is stopped, the rider can freely use the hand away from the brake lever 69.

The auxiliary wheel mechanism 153 can hold an auxiliary wheel 1 at an operative position while maintaining a state where the brake is actuated with the annular body 65, in combination with the auxiliary wheel mechanism 152 capable of holding the auxiliary wheel 1 at the operative position with the ratchet mechanism 53 (see FIG. 5). As a result, the bicycle 101 can be parked in a self-standing position without requiring use of a stand 26 (see FIGS. 1 and 2). The stand 26 can also be removed from the bicycle 101. Note that the annular body 65 may be provided with a member such as an adjuster to adjust the circumferential length.

Figure 7:
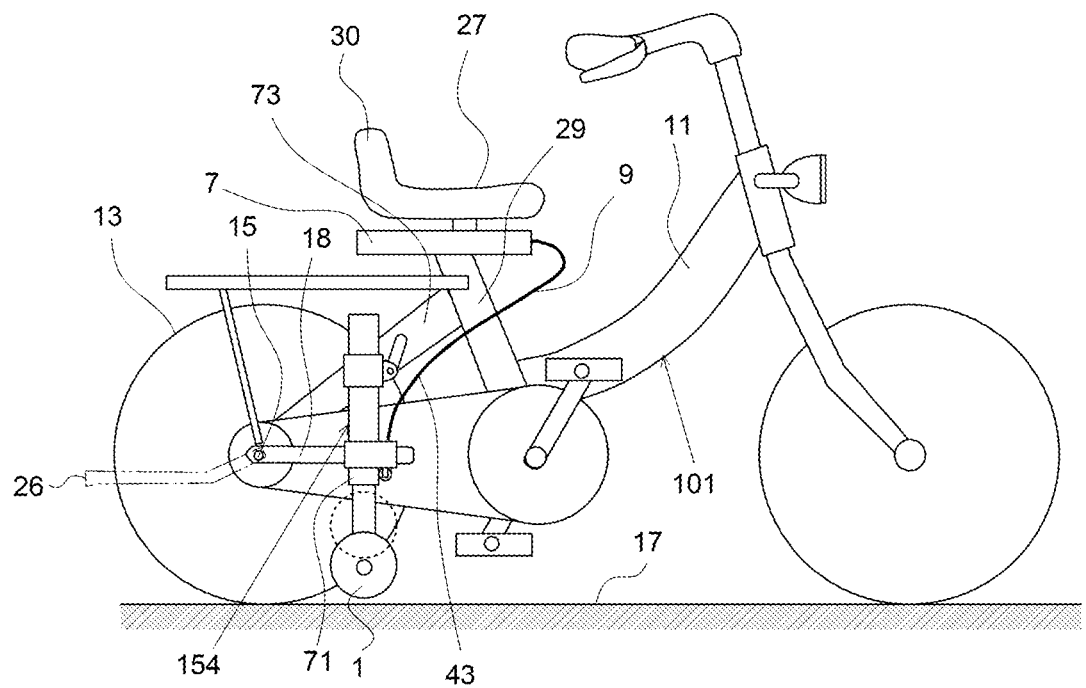
FIG. 7 is a schematic side view illustrating a bicycle in which an auxiliary wheel mechanism according to still another embodiment of the present invention is installed.

FIG. 7 is a schematic side view illustrating a bicycle in which an auxiliary wheel mechanism according to still another embodiment of the present invention is installed. Similarly to the auxiliary wheel mechanism 151, this auxiliary wheel mechanism 154 installed on a bicycle 101 includes an auxiliary wheel support member 71 in addition to an auxiliary wheel 1, a saddle support member 7, and a transmission member 9. The auxiliary wheel support member 71 is unmovably supported by a vehicle body 11 of the bicycle 101, and slidably supports the auxiliary wheel 1 allowing the auxiliary wheel 1 to come close to and retract from a road surface 17. In the illustrated example, the auxiliary wheel support member 71 supports the auxiliary wheel 1 such that the auxiliary wheel is vertically slidable, whereas the sliding axis may be somewhat inclined from the vertical axis. Further, in the illustrated example, the auxiliary wheel support member 71 is fixed to a chain stay 18 and a seat stay 73 in the vehicle body 11. As a preferable example, the auxiliary wheel 1, the auxiliary wheel support member 71, and the transmission member 9 are provided on the right and left of the vehicle body 11, individually forming a pair. Furthermore, in the illustrated example, as the transmission member 9 that transmits the backward and forward movement of a saddle 27 to the auxiliary wheel 1, a wire 45 (see FIGS. 8 and 9) and a wire insertion tube 43 that guides the wire 45 are used. When the saddle 27 is located at a front position, the auxiliary wheel 1 is at a retracted position, that is, at an upper position, and when the saddle 27 is located at a rear position, the auxiliary wheel 1 is at an operative position, that is, at a lower position.

Figure 8:
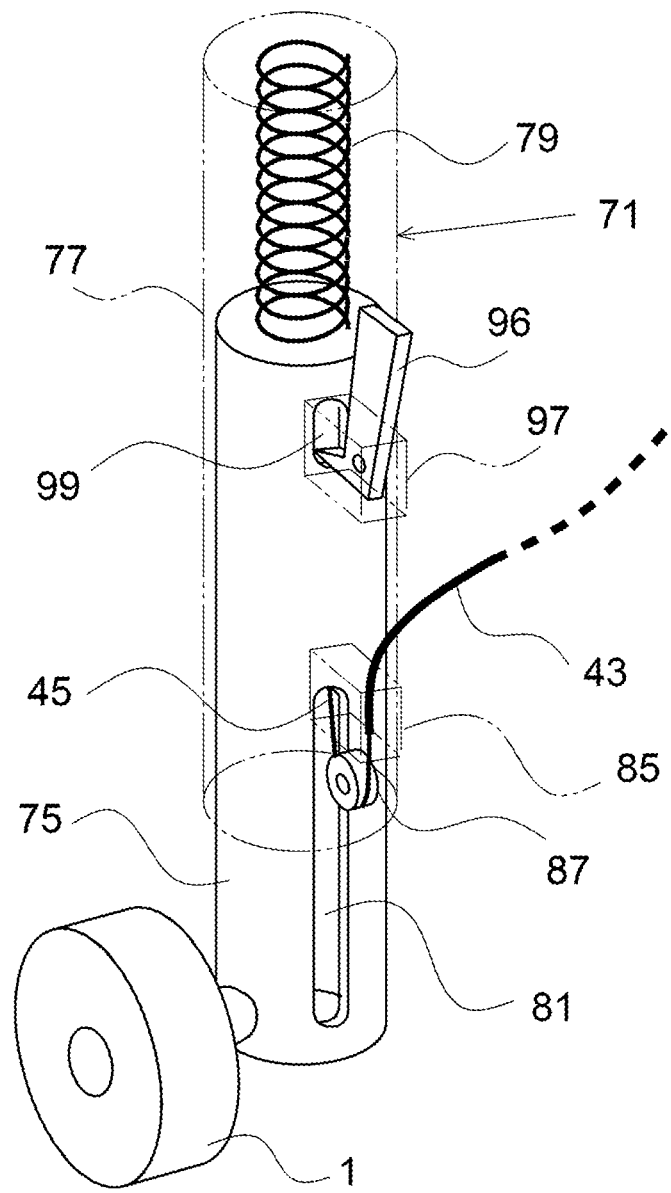
FIG. 8 is a perspective view illustrating a configuration of a part of the auxiliary wheel mechanism in FIG. 7.
Figure 9:
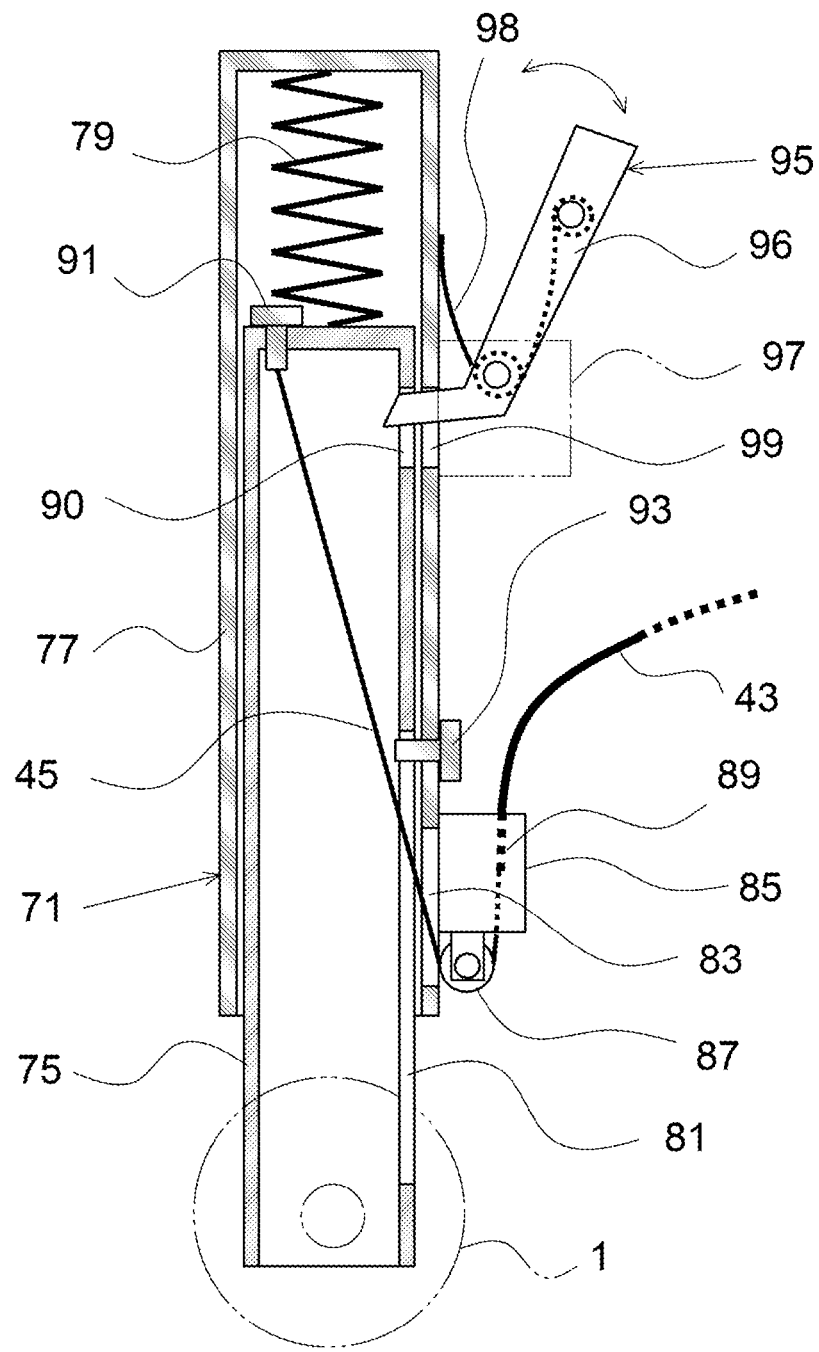
FIG. 9 is a longitudinal cross-sectional view illustrating a configuration of a part of the auxiliary wheel mechanism in FIG. 7.

FIGS. 8 and 9 respectively are a perspective view and a longitudinal cross-sectional view illustrating a configuration of the auxiliary wheel support member 71. The auxiliary wheel support member 71 has a slide member 75 and a guide member 77. The slide member 75 has a hollow cylindrical shape, and rotatably supports the auxiliary wheel 1 at a lower end. The guide member 77 has a hollow cylindrical shape having a diameter larger than that of the slide member 75, and receives the slide member 75 in the hollow portion and slidably guides the slide member 75 along an axis. As an example, the slide member 75 and the guide member 77 are made of metal such as steel.

To a top wall of the slide member 75 and a top wall of the guide member 77, an auxiliary wheel urging member 79 is connected. The auxiliary wheel urging member 79 urges the slide member 75 toward the top wall of the guide member 77 by a tensile elastic restoring force. This configuration causes the auxiliary wheel 1 to be urged to be located at the retracted position. In the illustrated example, the auxiliary wheel urging member 79 is a tension coil spring.

In a lower portion of a side wall of the slide member 75, a long hole 81 extending along an axis is formed. Also in a lower portion of the side wall of the guide member 77, a long hole 83 extending in an axis is also formed at a portion facing the long hole 81. On a side wall of the guide member 77, a pulley support member 85 is provided. The pulley support member 85 rotatably supports a pulley 87. The pulley 87 is supported at a position facing the long hole 83. The wire 45 having one end connected to a slider 31 (see FIGS. 3 and 4) has the other end which passes through a through hole 89 formed in the pulley support member 85, is bent in an extending direction by the pulley 87, passes through the long holes 83 and 81, and is connected to the top wall of the slide member 75. In the illustrated example, the other end of the wire 45 is connected to the top wall of the slide member 75 by a locking pin 91 locked to the top wall of the slide member 75. The other end of the wire 45 is fixed to the locking pin 91 made of metal, for example, by welding. One end of the wire insertion tube 43 through which the wire 45 is inserted is connected to a front wall 46 (see FIGS. 3 and 4) of the saddle support member 7, and the other end is connected to the pulley support member 85. In the illustrated example, the other end of the wire insertion tube 43 is inserted into the through hole 89 of the pulley support member 85.

When the saddle 27 is located at the front position, the slide member 75 is located at an upper position due to an elastic restoring force of the auxiliary wheel urging member 79. In this state, the auxiliary wheel 1 is at the retracted position where the auxiliary wheel 1 is away from the road surface 17 (see a dotted line in FIG. 7) upwardly. Whereas, when the saddle 27 is located at the rear position, the wire 45 exerts tension against the elastic restoring force of the auxiliary wheel urging member 79 to pull down the slide member 75. As a result, the auxiliary wheel 1 comes to be located at the operative position where the auxiliary wheel 1 is in contact with or in proximity to the road surface 17 (see FIG. 7). On a side wall of the guide member 77, a regulation pin 93 is provided. The regulation pin 93 is inserted into the long hole 81. As a result, rotation of the slide member 75 along a circumference is regulated. At the same time, an axial movement of the slide member 75 is also regulated so that the auxiliary wheel 1 does not move further downward beyond the operative position.

The guide member 77 is further provided with a ratchet mechanism 95. The ratchet mechanism 95 functions to releasably stop, at the operative position, the auxiliary wheel 1 having moved toward the road surface 17 to be located at the operative position. The ratchet mechanism 95 does not prevent the slide member 75 from moving toward a predetermined lower position corresponding to the operative position of the auxiliary wheel 1, whereas stops the slide member 75 at this predetermined position once the slide member 75 has moved to the predetermined lower position. As a result, the auxiliary wheel 1 is held at the operative position. The ratchet mechanism 95 can be released from the stopping state by a manual operation. When the stopping state is released, unless the rider pushes the saddle 27 backward, the saddle 27 returns to the front position due to an urging force of the auxiliary wheel urging member 79 and a saddle urging member 51. As a result, the auxiliary wheel 1 returns to a retracted position.

In the illustrated example, the ratchet mechanism 95 has a lever 96 having a claw at a distal end, a lever support member 97 that tunably supports the lever 96 on a side wall of the guide member 77, and an elastic member 98 that urges the lever 96 such that a claw moves toward a hollow portion of the guide member 77. In the illustrated example, the elastic member 98 is a torsion coil spring. On a side wall of the guide member 77, an opening 99 to receive a distal end portion of the claw of the lever 96 is formed. Further, on a side wall of the slide member 75, an opening 90 is formed at a position facing the opening 99 when the slide member 75 is at a predetermined lower position.

When the slide member 75 descends to the predetermined position so that the auxiliary wheel 1 descends from the retracted position to the operative position, the opening 90 and the opening 99 overlap each other. As a result, the distal end portion of the claw of the lever 96 is inserted into the opening 90 with an elastic restoring force of the elastic member 98, and the slide member 75 is stopped from returning upward by the distal end portion of the claw of the lever 96. In this manner, even when the vehicle body 11 tends to tilt toward a side due to a weight of the vehicle body 11, the rider, or the like, and thereby a weight load is applied to the auxiliary wheel 1, the auxiliary wheel 1 does not retract to the retracted position but stays at the operative position. Thus, the auxiliary wheel 1 is stably held at the operative position. When the rider tilts the lever 96 against the elastic restoring force of the elastic member 98, the slide member 75 is released from the locked state caused by the lever 96, and the auxiliary wheel 1 returns to the retracted position.

Figure 10:
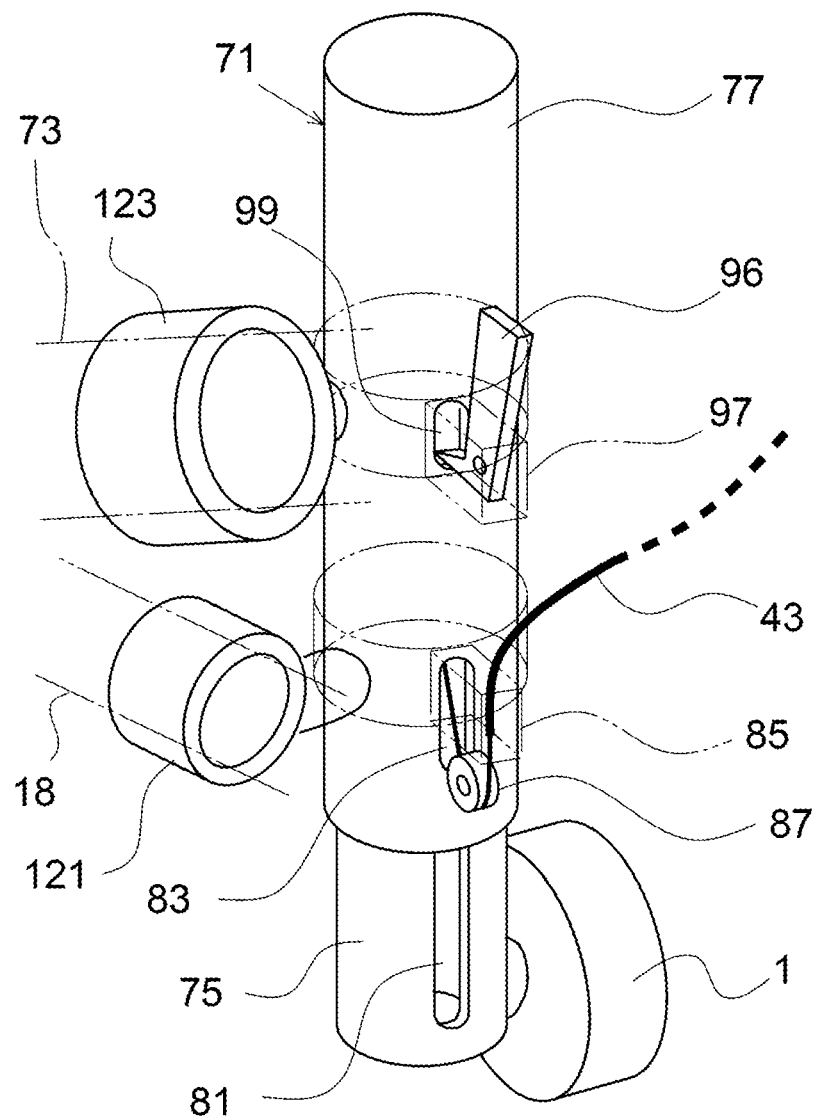
FIG. 10 is a perspective view illustrating a connecting portion connected with a vehicle body in relation to a part of the auxiliary wheel mechanism in FIG. 7.

FIG. 10 is a perspective view illustrating a connecting portion of the auxiliary wheel support member 71 connected with the vehicle body 11. In the illustrated example, the auxiliary wheel support member 71 is connected to the chain stay 18 of the vehicle body 11 by a connecting member 121, and is connected to the seat stay 73 of the vehicle body 11 by a connecting member 123. The connecting member 121 and the connecting member 123 have the same structure as each other except for dimensional differences. Note that the auxiliary wheel support member 71 of the illustrated example is provided on the left side of the vehicle body 11.

Figure 11:
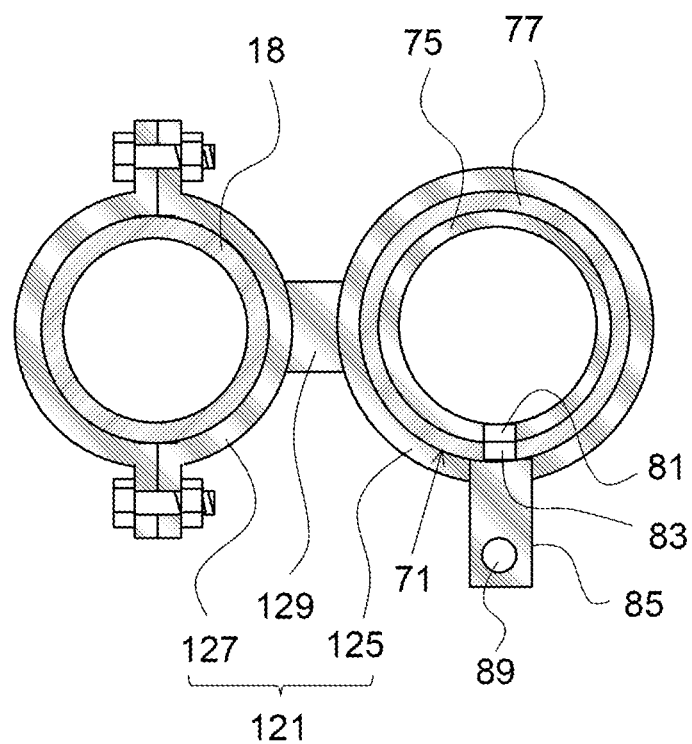
FIG. 11 is a cross-sectional view illustrating a connecting portion connected with a vehicle body in relation to a part of the auxiliary wheel mechanism in FIG. 7.

FIG. 11 is a cross-sectional view illustrating a structure of the connecting member 121 as a representative of the connecting members 121 and 123 in FIG. 10. Although the chain stay 18 and the guide member 77 intersect with each other in the air (see FIG. 7), FIG. 11 illustrates cross sections of the chain stay 18 and the guide member 77 assuming that both extend in parallel for convenience. The connecting member 121 includes an annular body 125 surrounding the guide member 77, an annular body 127 surrounding the chain stay 18, and a cross-linking portion 129 connecting the annular body 125 and the annular body 127 at a predetermined interval. As an example, the connecting member 121 is made of metal such as steel, and the annular body 125 is fixed to an outer surface of a side wall of the guide member 77 by welding, for example. In the illustrated example, the pulley support member 85 constitutes a part of the annular body 125. In the illustrated example, the annular body 127 is divided in half, and is fixed to the chain stay 18 by being integrally fastened with a screw in a state of sandwiching the chain stay 18.

Figure 12:
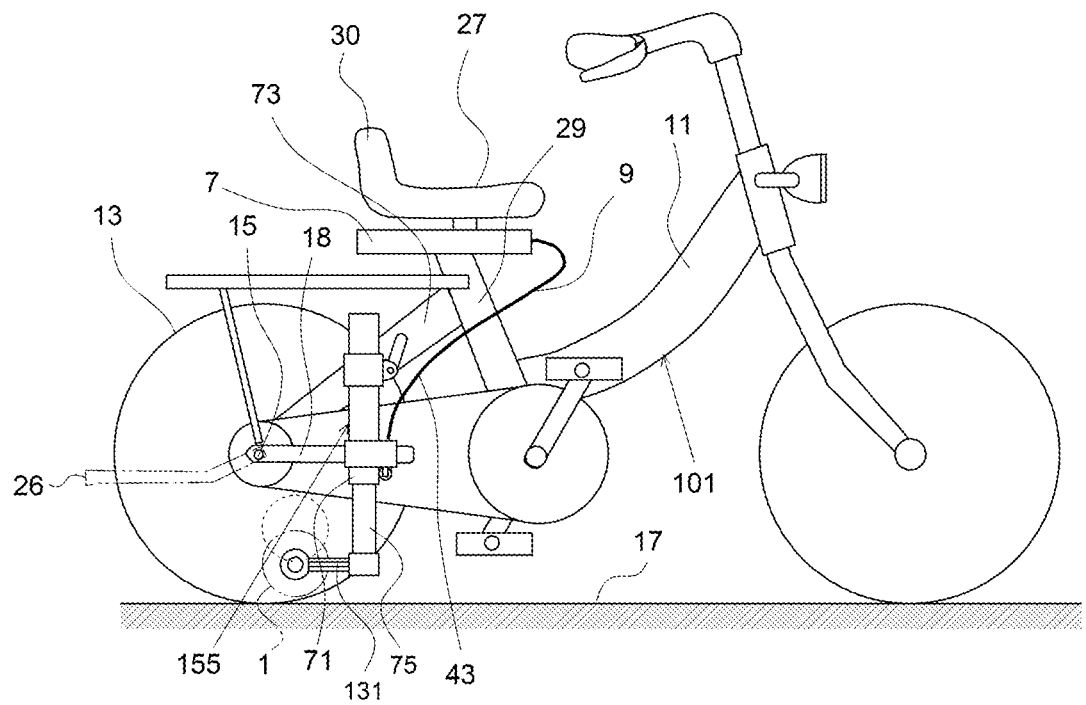
FIG. 12 is a schematic side view illustrating a bicycle in which an auxiliary wheel mechanism according to still another embodiment of the present invention is installed.

FIG. 12 is a schematic side view illustrating a bicycle in which an auxiliary wheel mechanism according to still another embodiment of the present invention is installed. In this auxiliary wheel mechanism 155 installed on a bicycle 101, an auxiliary wheel support member 71 has a buffer member 131 that absorbs or alleviates an impact from a road surface received by an auxiliary wheel 1 at an operative position. In the illustrated example, one end of the buffer member 131 is fixed to a lower end portion of a slide member 75 of the auxiliary wheel support member 71, and the other end is fixed to a bearing of the auxiliary wheel 1. In the illustrated example, the buffer member 131 is a stacked plate spring. When the auxiliary wheel 1 is at the operative position, an impact from a road surface transmitted from the auxiliary wheel 1 to a vehicle body 11 is absorbed or alleviated by the buffer member 131. Furthermore, since the auxiliary wheel 1 is at a position behind an attachment position where the auxiliary wheel support member 71 is attached to the vehicle body 11 and closer to an axle of the rear wheel 13 than the attachment position is, stability of the vehicle body 11 when the auxiliary wheel 1 is used is improved.

(Other Embodiment)

The auxiliary wheel mechanism 153 (see FIG. 6) can hold the auxiliary wheel 1 at the operative position while maintaining a state where the brake is actuated with the annular body 65, also in combination with the auxiliary wheel mechanisms 154 and 155 capable of holding the auxiliary wheel 1 at the operative position with the ratchet mechanism 95 (see FIG. 9). As a result, the bicycle 101 can be parked in a self-standing position without requiring use of the stand 26 (see FIGS. 1 and 2).

In the above embodiments, the auxiliary wheel 1, the auxiliary wheel support members 3 and 71, the fixing plate 5, and the transmission member 9 have been provided on the left and right of the vehicle body 11 of the bicycle 101, individually forming a pair. On the other hand, these members can also be provided only on one of the left and right sides of the vehicle body 11, for example, only on the left side.

In the above embodiments, the examples have been shown in which the auxiliary wheel mechanisms 151 to 155 are applied to the bicycle 101, but the present invention is generally applicable to a two-wheeled vehicle including a motorcycle.

This application is based on Japanese Patent Application No. 2019-230978 filed by the present applicant in Japan on Dec. 20, 2019 and Japanese Patent Application No. 2020-010446 filed by the present applicant in Japan on Jan. 25, 2020, the entire contents of which are incorporated herein by reference.

The above description of specific embodiments of the present invention has been presented for the purpose of exemplification. These are not intended to be exhaustive or to limit the present invention as it is in the form described. It is obvious to those skilled in the art that many modifications and variations are possible in light of the above description.

REFERENCE SIGNS LIST

1 auxiliary wheel
3 auxiliary wheel support member
5 fixing plate
7 saddle support member
9 transmission member
11 vehicle body
13 rear wheel
15 axle
17 road surface
18 chain stay
19 operative position regulating member
21 retracted position regulating member
23 auxiliary wheel urging member
25 pin
26 stand
27 saddle
29 seat tube
30 lower back rest
31 slider
33 tubular body
35 columnar body
37 opening
39 front end edge
41 rear end edge
43 wire insertion tube
45 wire
46 front wall
47, 49 through hole
51 saddle urging member
53 ratchet mechanism
55 lever
57 lever support member
59 elastic member
61 opening
63 handlebar
65 annular body
67 handlebar grip
69 brake lever
71 auxiliary wheel support member
73 seat stay
75 slide member
77 guide member
79 auxiliary wheel urging member 81 long hole
83 long hole
85 pulley support member
87 pulley
89 through hole
90 opening
91 locking pin
93 regulation pin
95 ratchet mechanism
96 lever
97 lever support member
98 elastic member
99 opening
101 bicycle
121 connecting member
123 connecting member
125, 127 annular body
129 cross-linking portion
131 buffer member
151, 152, 153, 154, 155 auxiliary wheel mechanism.

The invention claimed is:

1. An auxiliary wheel mechanism for a two-wheeled vehicle, the auxiliary wheel mechanism comprising:
an auxiliary wheel;
an auxiliary wheel support member that is supported by a vehicle body of the two-wheeled vehicle, and supports the auxiliary wheel such that the auxiliary wheel is located on a side of the rear wheel and is movable between a retracted position retracted from a road surface and an operative position where the auxiliary wheel supports the vehicle body against a road surface to prevent the vehicle body from tilting to a side;
a saddle support member that is provided on the vehicle body and supports a saddle such that the saddle is movable backward and forward;
a transmission member that transmits a backward and forward movement of the saddle to the auxiliary wheel support member such that the auxiliary wheel is located at the retracted position when the saddle is located at a front position, and is located at the operative position when the saddle is located at a rear position; and
an auxiliary wheel urging member that urges the auxiliary wheel with an elastic restoring force to place the saddle at the front position and the auxiliary wheel at the retracted position, wherein
the transmission member has a wire and a wire insertion tube that guides the wire, and the transmission member transmits a movement of the saddle toward the rear position to the auxiliary wheel support member by tension of the wire to cause a movement of the auxiliary wheel to the operative position.

2. An auxiliary wheel mechanism for a two-wheeled vehicle, the auxiliary wheel mechanism comprising:
an auxiliary wheel;
an auxiliary wheel support member that is supported by a vehicle body of the two-wheeled vehicle, and supports the auxiliary wheel such that the auxiliary wheel is located on a side of the rear wheel and is movable between a retracted position retracted from a road surface and an operative position where the auxiliary wheel supports the vehicle body against a road surface to prevent the vehicle body from tilting to a side;
a saddle support member that is provided on the vehicle body and supports a saddle such that the saddle is movable backward and forward;
a transmission member that transmits a backward and forward movement of the saddle to the auxiliary wheel support member such that the auxiliary wheel is located at the retracted position when the saddle is located at a front position, and is located at the operative position when the saddle is located at a rear position; and
an auxiliary wheel urging member that urges the auxiliary wheel with an elastic restoring force to place the saddle at the front position and the auxiliary wheel at the retracted position, wherein
the auxiliary wheel mechanism further includes a saddle urging member that urges the saddle toward the front position with an elastic restoring force.

3. The auxiliary wheel mechanism for the two-wheeled vehicle according to claim 1, wherein the saddle includes a lower back rest standing at a rear portion.

4. An auxiliary wheel mechanism for a two-wheeled vehicle, the auxiliary wheel mechanism comprising:
an auxiliary wheel;
an auxiliary wheel support member that is supported by a vehicle body of the two-wheeled vehicle, and supports the auxiliary wheel such that the auxiliary wheel is located on a side of the rear wheel and is movable between a retracted position retracted from a road surface and an operative position where the auxiliary wheel supports the vehicle body against a road surface to prevent the vehicle body from tilting to a side;
a saddle support member that is provided on the vehicle body and supports a saddle such that the saddle is movable backward and forward;
a transmission member that transmits a backward and forward movement of the saddle to the auxiliary wheel support member such that the auxiliary wheel is located at the retracted position when the saddle is located at a front position, and is located at the operative position when the saddle is located at a rear position; and
an auxiliary wheel urging member that urges the auxiliary wheel with an elastic restoring force to place the saddle at the front position and the auxiliary wheel at the retracted position, wherein
the auxiliary wheel support member has a proximal end portion turnably supported by the vehicle body and a distal end portion rotatably supporting the auxiliary wheel;
the distal end portion is located in a rear of the proximal end portion when the auxiliary wheel is located at the retracted position;
the distal end portion is located below or in front of the proximal end portion when the auxiliary wheel is at the operative position;
the auxiliary wheel mechanism for the two-wheeled vehicle further includes an operative position regulating member; and
the operative position regulating member is supported by the vehicle body, and regulates the operative position of the auxiliary wheel by abutting on the auxiliary wheel support member to prevent the distal end portion of the auxiliary wheel support member from being positioned further ahead beyond a position predetermined in front of the proximal end portion.

5. An auxiliary wheel mechanism for a two-wheeled vehicle, the auxiliary wheel mechanism comprising:
an auxiliary wheel;
an auxiliary wheel support member that is supported by a vehicle body of the two-wheeled vehicle, and supports the auxiliary wheel such that the auxiliary wheel is located on a side of the rear wheel and is movable between a retracted position retracted from a road surface and an operative position where the auxiliary wheel supports the vehicle body against a road surface to prevent the vehicle body from tilting to a side;

a saddle support member that is provided on the vehicle body and supports a saddle such that the saddle is movable backward and forward;

a transmission member that transmits a backward and forward movement of the saddle to the auxiliary wheel support member such that the auxiliary wheel is located at the retracted position when the saddle is located at a front position, and is located at the operative position when the saddle is located at a rear position; and an auxiliary wheel urging member that urges the auxiliary wheel with an elastic restoring force to place the saddle at the front position and the auxiliary wheel at the retracted position, wherein the auxiliary wheel support member is supported by the vehicle body, and slidably supports the auxiliary wheel, allowing the auxiliary wheel to come close to and retract from the road surface, and the auxiliary wheel support member has a first ratchet mechanism that releasably stops, at the operative position, the auxiliary wheel having moved toward the road surface to be located at the operative position.

6. The auxiliary wheel mechanism for the two-wheeled vehicle according to claim 5, wherein the auxiliary wheel support member has a buffer member that absorbs or alleviates an impact from the road surface received by the auxiliary wheel located at the operative position.

7. An auxiliary wheel mechanism for a two-wheeled vehicle, the auxiliary wheel mechanism comprising:

an auxiliary wheel;

an auxiliary wheel support member that is supported by a vehicle body of the two-wheeled vehicle, and supports the auxiliary wheel such that the auxiliary wheel is located on a side of the rear wheel and is movable between a retracted position retracted from a road surface and an operative position where the auxiliary wheel supports the vehicle body against a road surface to prevent the vehicle body from tilting to a side;

a saddle support member that is provided on the vehicle body and supports a saddle such that the saddle is movable backward and forward;

a transmission member that transmits a backward and forward movement of the saddle to the auxiliary wheel support member such that the auxiliary wheel is located at the retracted position when the saddle is located at a front position, and is located at the operative position when the saddle is located at a rear position; and an auxiliary wheel urging member that urges the auxiliary wheel with an elastic restoring force to place the saddle at the front position and the auxiliary wheel at the retracted position, wherein the saddle support member has a second ratchet mechanism that releasably holds, at the rear position, the saddle having moved to the rear position to cause the auxiliary wheel to be located at the operative position.

8. An auxiliary wheel mechanism for a two-wheeled vehicle, the auxiliary wheel mechanism comprising:

an auxiliary wheel;

an auxiliary wheel support member that is supported by a vehicle body of the two-wheeled vehicle, and supports the auxiliary wheel such that the auxiliary wheel is located on a side of the rear wheel and is movable between a retracted position retracted from a road surface and an operative position where the auxiliary wheel supports the vehicle body against a road surface to prevent the vehicle body from tilting to a side;

a saddle support member that is provided on the vehicle body and supports a saddle such that the saddle is movable backward and forward;

a transmission member that transmits a backward and forward movement of the saddle to the auxiliary wheel support member such that the auxiliary wheel is located at the retracted position when the saddle is located at a front position, and is located at the operative position when the saddle is located at a rear position; and an auxiliary wheel urging member that urges the auxiliary wheel with an elastic restoring force to place the saddle at the front position and the auxiliary wheel at the retracted position, wherein the auxiliary wheel mechanism further includes an annular body surrounding a brake lever and a handlebar grip of the two-wheeled vehicle, the annular body is slidable between a proximal end portion and a distal end portion of the handlebar grip, the brake lever is in a standby state when the annular body is at the proximal end portion, and the brake lever turns toward the handlebar grip to actuate a brake when the annular body approaches the distal end portion.

9. The auxiliary wheel mechanism for the two-wheeled vehicle according to claim 2, wherein the saddle includes a lower back rest standing at a rear portion.

* * * * *